June 12, 1945.  J. JANDASEK  2,378,085
TRANSMISSION
Filed Jan. 26, 1942   3 Sheets-Sheet 2

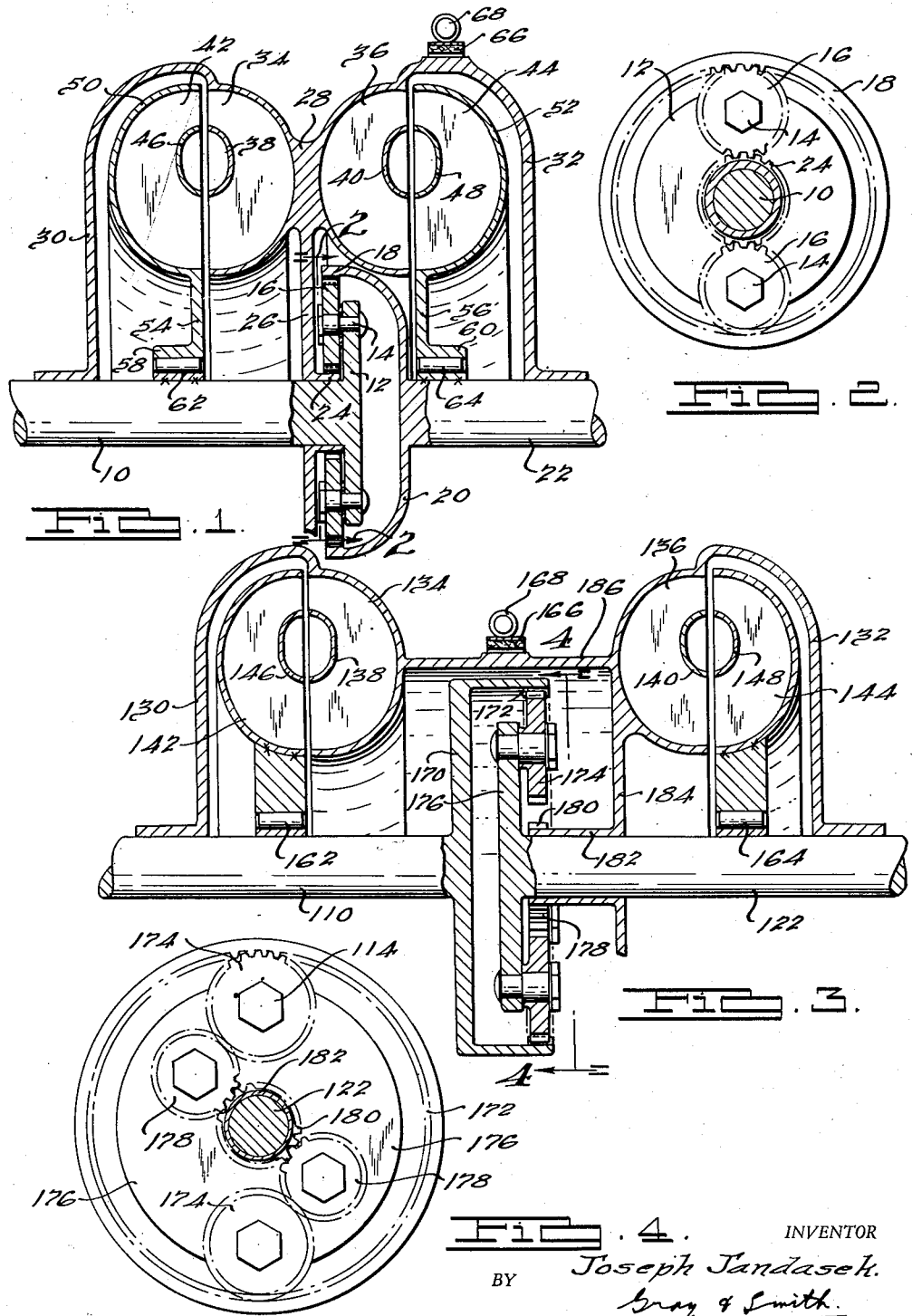

INVENTOR.
JOSEPH JANDASEK
BY
A. E. Wilson
ATTORNEY.

June 12, 1945.  J. JANDASEK  2,378,085

TRANSMISSION

Filed Jan. 26, 1942  3 Sheets-Sheet 3

INVENTOR.
JOSEPH JANDASEK
BY
A. C. Wilson.
ATTORNEY.

Patented June 12, 1945

2,378,085

UNITED STATES PATENT OFFICE 2,378,085

TRANSMISSION

Joseph Jandasek, Detroit, Mich., assignor to Bendix Aviation Corporation, South Bend, Ind., a corporation of Delaware Application January 26, 1942, Serial No. 428,145

13 Claims. (Cl. 74—189.5)

This invention relates to transmissions and more particularly to power transmitting devices whereby torque may be transmitted mechanically and through a circulating fluid.

An object of this invention is to provide a power transmitting device operable to transmit power from a driving to a driven shaft through mechanical and fluid transmissions.

Another object of this invention resides in the provision of a novel regenerative and two-path power flow including a mechanical and a fluid transmission.

A further object is to provide a regenerative power transmitting device wherein at slow speeds or heavy loads a portion of the applied power may be returned to the driving shaft to increase the torque applied thereto.

Another object of the invention resides in the provision of a transmission having mechanical gearing interposed between a driving shaft and a driven shaft and wherein fluid power transmitting means driven by the mechanical gearing are provided to direct torque to the driving and driven shafts in accordance with the loads exerated on said shafts.

Another object is to provide a mechanical connection between driving and driven shafts and an auxiliary seltctively operable connection between the mechanical gearing and the driving and driven shafts to cooperate with the mechanical gearing in the transmission of varying torque from the driving to the driven shaft.

Another object is to provide a transmission having a regenerative and two-path power flow between driving and driven shafts whereby torque may be directed from the driving to the driven shafts through mechanical or fluid power transmitting means and wherein automatic or manually operated means are provided to render inoperative the regenerative and fluid power transmission devices to transmit power from the driving shaft to the driven shaft at over or underdrive speeds.

Yet a still further object of the invention resides in the provision of fluid power transmitting means operably connected to a regenerative fluid power transmitting device to transmit to the driven shaft a portion of the applied torque to decrease the amount of power regenerated and thereby prevent overloading of the regenerative system.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a longitudinal sectional view of a device embodying the present invention wherein the driven shaft may be operated at overdrive speed.

Fig. 2 is a sectional view taken substantially on the line 2—2 of Fig. 1, looking in the direction of the arrows.

Fig. 3 is a longitudinal sectional view of an embodiment of the invention wherein the driven shaft may be operated at underdrive speed to transmit increased torque from the driving to the driven shaft.

Fig. 4 is a sectional view taken substantially on the line 4—4 of Fig. 3, looking in the direction of the arrows.

Figure 5:
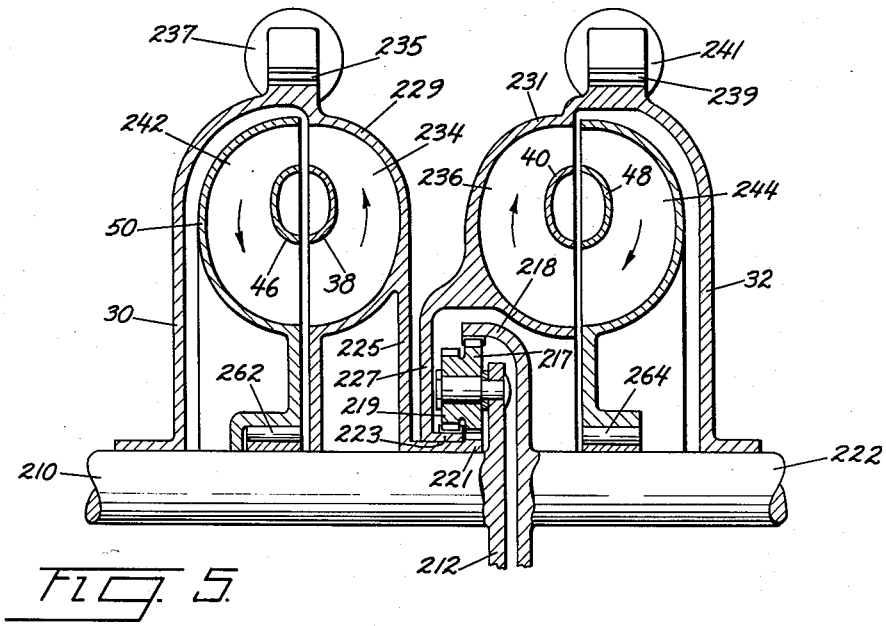
Fig. 5 is a view similar to Fig. 1 illustrating a modified form of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring particularly to Fig. 1, a driving shaft 10 is provided with a radially extended flange 12 having thereon a plurality of spaced pins 14 supporting pinions 16. The pinions 16 mesh with and drive a ring gear gear 18 carried by a flange 20 on a driven shaft 22 preferably aligned with the driving shaft 10.

The pinions 16 mesh with a sun gear 24 carried by a flange 26 on a rotatable housing 28 having radially extending flanges 30 and 32 coaxially aligned with the driving shaft 10 and the driven shaft 22. The housing 28 is formed with spaced impellers 34 and 36 having suitable blades interposed between shrouds 38 and 40 respectively and the housing.

The impellers 34 and 36 are aligned with turbines 42 and 44 having suitable vanes interposed between shrouds 46 and 48 and webs 50 and 52 respectively. The webs 50 and 52 of the turbines 42 and 44 are provided with radially extended flanges 54 and 56 on hubs 58 and 60 respectively. The hubs 58 and 60 are mounted on the driving and driven shafts 10 and 22 respectively by one-way driving means 62 and 64 whereby power may be transmitted in one direction only from each of the turbines 42 and 44 to its associated driving or driven shaft 10 or 22 to regenerate power to the driving shaft 10 and to form an auxiliary path for the flow of power from the driving to the driven shaft.

Means may be provided for restraining the housing 28 against rotation. One desirable means for restraining the housing against rotation comprises a brake member 66 operated by a hydraulic unit 68 to hold the housing 28 stationary so as to render the regenerative and auxiliary fluid transmission units inoperative and to lock the sun gear 24 against rotation. When the sun gear 24 is thus held against rotation the planet pinions 16 roll about the sun gear 24 as the driving shaft 10 rotates to transmit power through the ring gear 18 to drive the driven shaft 22 at an overdrive speed with a corresponding reduction of torque.

The operation of this device is as follows: When power is applied to rotate the driving shaft 10 with the driven shaft 22 stationary, a portion of the torque transmitted is exerted through the planet pinions 16 to exert a force on the ring gear 18 tending to rotate the driven shaft 22. The remainder of the power is transmitted through the pinions 16 to rotate the sun gear 24 and housing 28. Rotation of the housing 28 results in driving the impellers 34 and 36 and thus energizing the fluid in the fluid power units. The fluid energized by the impellers 34 and 36 is exerted on the turbines 42 and 44 and is directed through the one-way driving means 62 and 64 to regenerate a portion of the power effective to increase the torque exerted on the driving shaft 10, and to augment the torque transmitted through the mechanical gearing to rotate the driven shaft 22.

During the initial stages of operation, when the driven shaft 22 is subjected to a heavy load, rotation of the driving shaft 10 will rotate the sun gear 24 and the housing 28 to actuate the regenerative and auxiliary power flow fluid transmission units. When the power regenerated through the regenerative fluid power unit increases to a point that the total torque applied to the driving shaft 10 and exerted on the driven shaft 22 through the mechanical and auxiliary fluid power unit increases to a point to overcome the resistance of the driven shaft 22, it will begin to rotate.

As the speed of the driven shaft 22 increases relative to the speed of rotation of the driving shaft 10, the proportion of power transmitted through the fluid power units is decreased. Since the driving shaft 10 rotates during this stage of the operation at a higher speed than the driven shaft, the energy absorbed by the regenerative fluid power unit 42 will be proportionately less than the energy absorbed by the auxiliary drive and transmitted through the fluid unit 44 operably connected to the driven shaft 22.

It will be observed that the impellers 34 and 36 operating to transmit power through fluid to the driving and driven shafts respectively are driven at the same speeds. If desired, one of the fluid transmission units operably connected to the driving or driven shafts may be made larger than the other to transmit a greater proportion of the power to the driving or the driven shaft. It will also be apparent that if desired the flange 26, supporting the sun gear 24, may be connected to drive separate impellers of the fluid transmission through suitable speed varying means to vary the torque exerted on the driving or driven shaft 10 or 22 respectively by varying the speed of rotation of the impeller associated with the driving or driven shafts.

As the speed of rotation of the driven shaft 22 approaches the speed of rotation of the driving shaft 10 the brake band 66 may be actuated by the braking unit 68 to hold the housing 28 against rotation. When the housing 28 is held stationary the sun gear 24 does not revolve and power is transmitted from the driving shaft 10 to the driven shaft 22 through the pinions 16 and ring gear 18 at an overdrive speed with a corresponding reduction in torque multiplication. During this phase of the operation the one-way driving means 62 and 64 permit the driving shaft 10 and the driven shaft 22 to rotate freely within the hubs 58 and 60 of the regenerative and auxiliary fluid transmissions respectively.

It will be apparent that the braking unit 68 may be actuated manually or may be actuated automatically by speed or torque responsive means responsive to the speed or torque applied to or exerted on the driving or driven shaft or both or in accordance with the ratio or difference of speed and torque of the driving and driven shafts.

Fig. 5 illustrates an embodiment of the invention similar in many respects to that of Fig. 1, wherein separate means are provided for actuating the impellers of the fluid transmissions operably connected to the driving and driven shafts respectively. In view of the close similarity of the structure and the mode of operation thereof, corresponding parts have been given corresponding numerals with the addition of 200.

It will be noted that the radially-extended flange 212 of the driving shaft 210 is provided with double pinions 217 and 219 meshing with sun gears 221 and 223 carried by flanges 225 and 227 respectively. The flange 225 is fixed to a housing 229 enclosing the impeller 234 and the turbine 242. The flange 227 is fixed to a housing 231 enclosing the impeller 236 and turbine 244. The pinion gears 217 mesh with a ring gear 218 fixed to the driven shaft 222.

In the operation of this embodiment of the invention the pinion gears 217 being larger than the pinion gears 219 will drive the sun gear 221 at a higher speed than the sun gear 223 is driven by the pinion gears 219. The impeller 234 operably connected through the turbine 242 and one-way driving means 262 to the driving shaft 210 will therefore be driven at a higher speed than the driven shaft 222 operably connected to the pinions 219 through the flange 227, impeller 236, turbine 244, and one-way driving means 264.

The housing 229 may be locked against rotation by means of the brake member 235 actuated by a brake mechanism 237 to hold the sun gear 221 against rotation and render inoperative the regenerative fluid transmission associated with the driving shaft 210.

The housing 231 may be locked against rotation by means of a brake member 239 actuated by the brake mechanism 241 to lock the sun gear 223 against rotation and render inoperative the auxiliary fluid transmission.

It will be noted that in view of the difference in diameter of the pinion gears 217 and 219 and the corresponding difference in diameters of the sun gears 221 and 223, variation in the speed of rotation may be effected by selectively actuating the brake mechanisms 237 or 241 to lock its associated housing and sun gear members.

Figure 7:
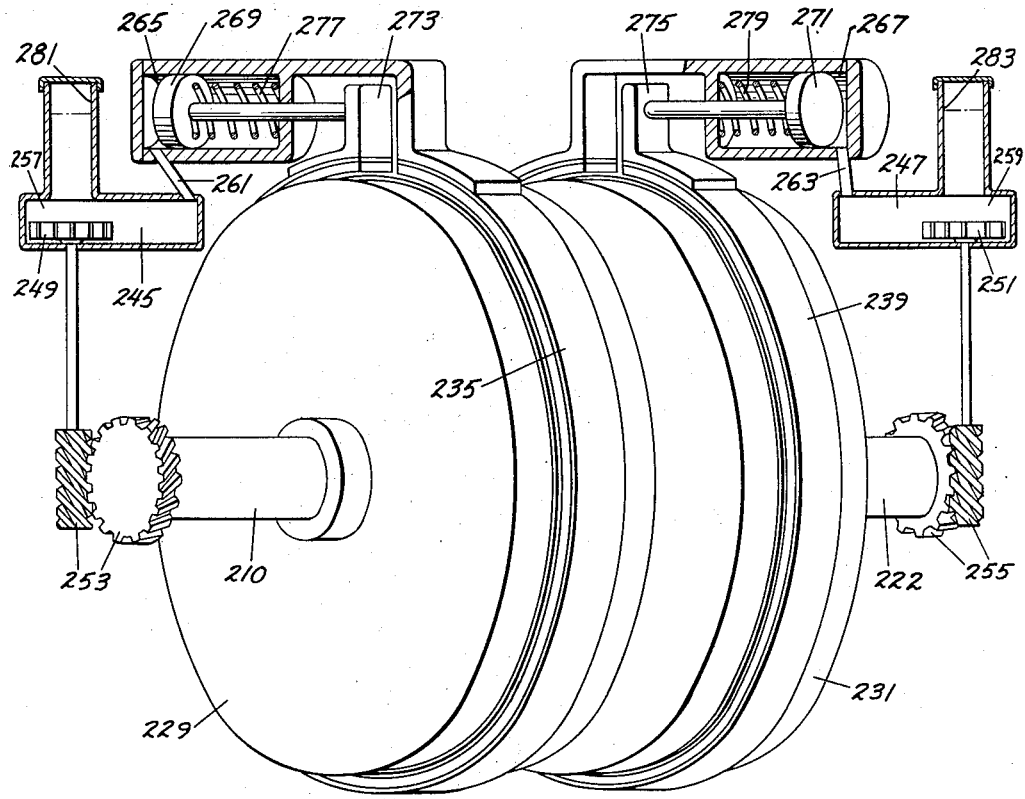
Fig. 7 is a perspective view illustrating the automatic control of the speed-varying means.

The brake members 235 and 239 may, as illustrated in Fig. 7, be actuated hydraulically. Fluid displacement pumps 245 and 247 having impellers 249 and 251 may be operably connected to the driving and driven shafts 210 and 222 by gears 253 and 255 respectively. The impellers 249 and 251 operate in chambers 257 and 259 connected by conduits 261 and 263 with cylinders 265 and 267 respectively. The cylinders 265 and 267 are provided with pistons 269 and 271 operably connected to movable portions 273 and 275 of the brake members 235 and 239 respectively. Springs 277 and 279 are provided to yieldingly urge the brake members to the released or inoperative position. Chambers 257 and 259 are provided with standpipes 281 and 283 respectively having removable covers whereby liquid may be introduced into the chambers when desired.

In the operation of this control mechanism fluid pressure is developed in the chambers 257 and 259 proportionate to variation of speed of the driving and driven shafts 210 and 222 respectively by means of the impellers 249 and 251 operably connected to the shafts by the gear members 253 and 255 respectively. This fluid pressure is transmitted through the conduits 261 and 263 to be exerted on the pistons 269 and 271 slidably mounted in the cylinders 265 and 267 to actuate the movable portions 273 and 275 of the brake members 235 and 239 respectively in proportion to variations of speed of the driving and driven shafts 210 and 222.

The embodiment of the invention illustrated in Figs. 3 and 4 is similar in many respects to that illustrated in Figs. 1 and 2. Corresponding parts have therefore been given corresponding reference numerals with the addition of 100.

A radially extended flange 170 on the driving shaft 110 has a drum supporting a ring gear 172. The ring gear 172 meshes with spaced pinions 174 rotatably mounted on a flange 176 on a driven shaft 122. The pinions 174 also mesh with auxiliary pinions 178 rotatably mounted on the flange 176. The pinions 178 mesh with and drive a sun gear 180 fixed to a sleeve 182 rotatably mounted on the driven shaft 122. The sleeve 182 has a radial flange 184 which supports a housing 186 corresponding with the housing 28 of the embodiment of the invention illustrated in Figs. 1 and 2.

In the operation of this embodiment of the invention, power is transmitted from the driving shaft 110 through the flange 170, the ring gear 172, the pinions 174 and flange 176 to the driven shaft 122. A portion of the power exerted by the driving shaft 110 is effective to urge the driven shaft 122 to rotate in the forward direction. The remainder of the applied power is transmitted through the pinion gears 178 to rotate the sun gear 180 and thence through the sleeve 182 to rotate the flange 184 and housing 186 in the same direction of rotation as the driving shaft 110.

Power is transmitted through the impeller members 134 and 136 and the turbine members 142 and 144 and one-way driving means 162 and 164 to the driving shaft 110 and driven shaft 122 respectively. A portion of the power is thus regenerated to the driving shaft and a portion of the power is exerted on the driven shaft 122 through the auxiliary fluid power transmitting means.

The operation of this embodiment is substantially the same as that of Fig. 1 insofar as the progressive decrease of power regenerated and transmitted from the driving to the driven shaft through the fluid transmissions as the speed of rotation of the driven shaft 122 increases relative to the speed of rotation of the driving shaft 110 is concerned.

If increased torque multiplication is desired, the operator may actuate the brake structure 166 and 168 to hold the housing 186 against rotation thereby rendering inoperative the regenerative and auxiliary fluid power mechanisms. When the housing 186 is held against rotation the sun gear 180 remains stationary and power is transmitted from the driving shaft through the ring gear 172, pinions 174 and 178, flange 176 to rotate the driven shaft 122 at underdrive with a corresponding increase in torque multiplication. The braking mechanism 168 for controlling the housing 186 may be actuated manually or automatically as discussed above in connection with the embodiment of the invention of Figs. 1 and 2.

Figure 6:
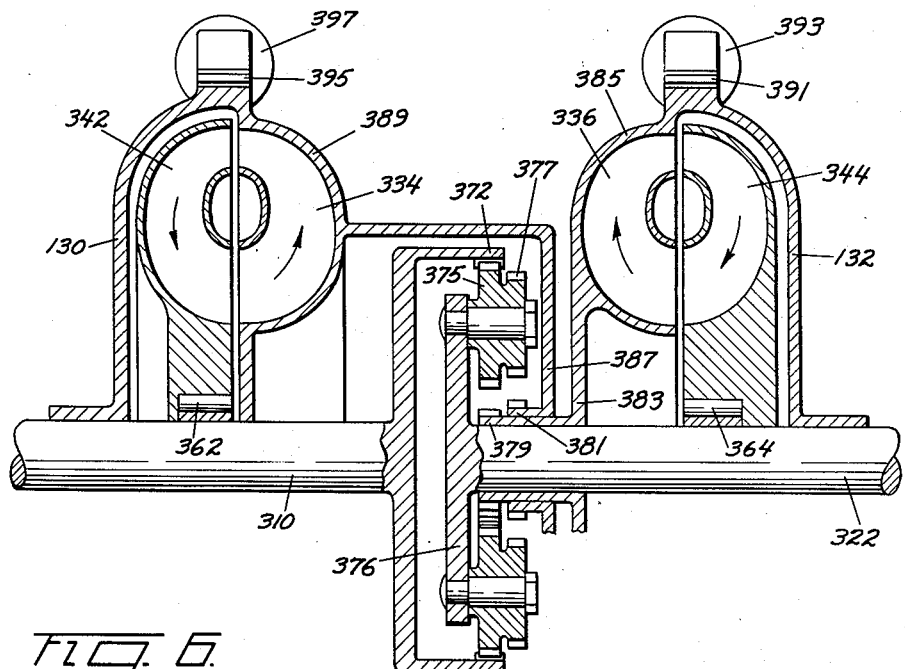
Fig. 6 is a view similar to Fig. 3 illustrating a further modified form of the invention.

Fig. 6 illustrates an embodiment of the invention which is similar in many respects to that of Fig. 3 to embody means to separately actuate the regenerative and auxiliary fluid transmissions operably connected to the driving and driven shafts respectively. Parts of Fig. 6 corresponding with the elements of Fig. 3 have been given corresponding reference numerals with the addition of 200.

The ring gear 372 of the driving shaft 310 meshes with a pinion gear 375 carried by the flange 376 of the driven shaft 322. A pinion 377 is positioned adjacent the pinion 375 and is of smaller diameter than the pinion 375. The pinions 375 and 377 are operably connected through suitable idler gears, as generally indicated in Fig. 4, to sun gears 379 and 381. The sun gear 379 is connected through a flange 383 to a housing 385 enclosing the impeller 336 and turbine 344 of the auxiliary fluid transmission preferably concentrically mounted on the driven shaft 322 and operably connected thereto by means of the one-way driving means 364.

The sun gear 381 is connected by way of the flange 387 to a housing 389 housing the impeller 334 and turbine 342 of the regenerative fluid transmission operably connected through the one-way driving means 362 with the driving shaft 310. The housing 385 may be engaged by a brake member 391 actuated by braking mechanism 393 to lock the housing 385 and sun gear 379 against rotation, thereby rendering inoperative the auxiliary fluid transmission and varying the gear ratio of power transmitted through the planetary gearing from the driving shaft to the driven shaft. The brake mechanism 395 actuated by brake mechanism 397 may engage the housing 389 to hold it against rotation, thereby rendering inoperative the regenerative fluid transmission and locking the sun gear 381 against rotation to vary the ratio of power transmitted through the planetary gearing from the driving shaft 310 to the driven shaft 322.

Figure 8:
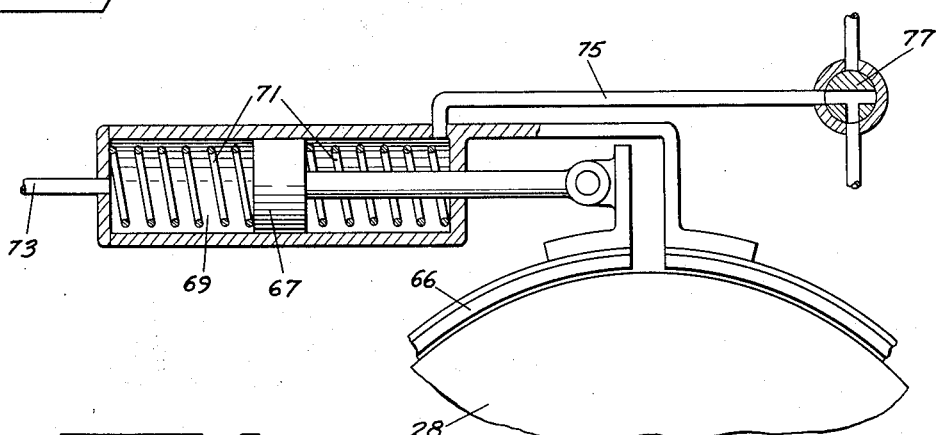
Fig. 8 is a part sectional view illustrating a modified form of automatic control mechanism.

When it is desired to control the rotatable housing 28 of Fig. 1 or 186 of Fig. 2 or either or both of the rotatable housings of Figs. 5 and 6 in accordance with the difference of speed of the driving and driven shafts, the brake mechanism such as 66 of Fig. 8 may be actuated by a piston 67 slidably mounted in a cylinder 69 and yieldingly urged toward a neutral position by opposed springs 71. Conduits 73 and 75 may be provided to admit fluid under pressure to opposite ends of the cylinder 69, and the admission of fluid may be controlled by suitable valve means such as the valve member 77. The conduits 73 and 75 may be connected with chambers corresponding with the chambers 245 and 247 respectively of Figure 7 to admit fluid proportionate to variations of speed of the driving and driven shafts.

I claim:

1. A transmission comprising a driving shaft, a driven shaft, mechanical gearing interposed between the shafts, a housing mounted for rotation on the shafts and driven by said mechanical gearing, spaced impellers carried by said rotatable housing, spaced turbines aligned with said impellers, and one-way driving means between each of the turbines and the driving and driven shafts respectively.

2. In a transmission, a driving shaft, a driven shaft, planetary gearing interposed between the driving and driven shafts, spaced fluid energizing impellers driven by the planetary gearing, spaced energy absorbing turbines cooperating with the impellers to provide power transmitting fluid circuits, and connecting means between the turbines and the driving and driven shafts respectively whereby a portion of the applied power may be regenerated and exerted on the driving shaft and a portion of the applied power may be exerted on the driven shaft.

3. A regenerative two-path power flow transmission comprising driving and driven shafts, a first power path including planetary gearing connecting the driving and driven shafts, a regenerative fluid transmission, means connecting the planetary gearing and the regenerative fluid transmission, means connecting the regenerative fluid transmission and the driving shaft, a second power path including a fluid transmission, means connecting the second fluid transmission and the planetary gearing, and means connecting the second fluid transmission and the driven shaft.

4. A transmission comprising a driving shaft, a driven shaft, planetary gearing including a plurality of members interposed between the driving and driven shafts, a regenerative fluid transmission between one member of the planetary gearing and the driving shaft, and a fluid transmission between said one member of the planetary gearing and the driven shaft.

5. A transmission comprising a driving shaft, a driven shaft, planetary gearing including a sun gear, pinions, and a ring gear connecting the driving and driven shafts, a regenerative fluid transmission connected to the sun gear, one-way driving means between the regenerative fluid transmission and the driving shaft, an auxiliary fluid transmission driven by said sun gear, and means connecting the auxiliary transmission to the driven shaft.

6. A transmission comprising driving and driven shafts, a housing rotatable on the shafts, means connecting the shafts, spaced fluid transmissions in the housing actuated by said connecting means and operably connected to the shafts, and means for control of the connecting means for operation at different speeds.

7. A transmission comprising a driving shaft, planet pinions carried by the driving shaft, a driven shaft, a ring gear carried by the driven shaft, a sun gear driven by the planet pinions, spaced fluid transmissions each comprising an impeller and a turbine cooperating to provide a power transmitting fluid circuit, means connecting the sun gear and said impellers, and one-way driving means connecting the turbines to the driving and driven shafts respectively.

8. A transmission comprising a driving shaft, a driven shaft, mechanical gearing connecting the shafts, a housing rotatably mounted on the driving shaft and operated by said mechanical gearing, spaced impellers carried by said rotatable housing, turbines aligned with said impellers and cooperating therewith to provide power transmitting fluid circuits, one-way driving means between one of said turbines and the driving shaft, and one-way driving means between the other of said turbines and the driven shaft.

9. A transmission comprising a driving shaft, a ring gear carried by the driving shaft, a driven shaft, planet pinions carried by the driven shaft, a sun gear driven by the planet pinions, spaced fluid transmissions each comprising an impeller and a turbine cooperating to provide a power transmitting fluid circuit, means connecting the sun gear and said impellers, and one-way driving means between the turbines and the driving and driven shafts respectively.

10. A transmission comprising a driving shaft, a driven shaft, planetary gearing connecting the driving and driven shafts, a rotatable member, means to drive the rotatable member from the planetary gearing, a fluid transmission interposed between the rotatable member and the driving shaft operative to regenerate a portion of the applied power so as to increase the torque of the driving shaft, and a second fluid transmission interposed between the rotatable member and the driven shaft operative to transmit a portion of the applied power to the driven shaft and to limit the load applied to the fluid transmisson interposed between the rotatable member and the driving shaft.

11. A transmission comprising a driving shaft, planet pinions carried by the driving shaft, a driven shaft, a ring gear carried by the driven shaft, a sun gear driven by the planet pinions, spaced fluid transmissions comprising impellers and turbines cooperating to provide separately operable power transmitting fluid circuits, means connecting the sun gear and said impellers, one-way driving means between the turbines and the driving and driven shafts respectively, and means to selectively lock said impellers against rotation to operate the transmission at a different speed.

12. A transmission comprising a driving shaft, a ring gear carried by the driving shaft, a driven shaft, planet pinions carried by the driven shaft, a sun gear driven by the planet pinions, spaced fluid transmissions comprising impellers and turbines cooperating to provide separately operable power transmitting fluid circuits, means connecting the sun gear and said impellers, one-way driving means between the turbines and the driving and driven shafts respectively, and means to selectively lock said impellers against rotation to operate the transmission at a different speed.

13. A transmission comprising driving and driven shafts, planetary gearing interposed between the driving and driven shafts, fluid power transmitting means including impeller and turbine members cooperating to provide spaced power transmitting fluid circuits, means connecting the planetary gearing and the impellers, one-way driving means between the turbines and the driving and driven shafts, and manually operable braking means to render the fluid power transmitting means inoperative.

JOSEPH JANDASEK.